US012651851B2

(12) United States Patent
Liu et al.

(10) Patent No.: US 12,651,851 B2
(45) Date of Patent: Jun. 9, 2026

(54) ANTENNA AND TERMINAL DEVICE

(71) Applicant: HUAWEI TECHNOLOGIES CO., LTD., Guangdong (CN)

(72) Inventors: Qing Liu, Shenzhen (CN); Qi Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/552,845

(22) PCT Filed: Mar. 28, 2022

(86) PCT No.: PCT/CN2022/083410
§ 371 (c)(1),
(2) Date: Sep. 27, 2023

(87) PCT Pub. No.: WO2022/206682
PCT Pub. Date: Oct. 6, 2022

(65) Prior Publication Data
US 2024/0170860 A1 May 23, 2024

(30) Foreign Application Priority Data
Mar. 30, 2021 (CN) ........................ 202110341374.X

(51) Int. Cl.
*H01Q 21/30* (2006.01)
*H01Q 1/32* (2006.01)
(Continued)

(52) U.S. Cl.
CPC ........... *H01Q 21/30* (2013.01); *H01Q 1/3275* (2013.01); *H01Q 1/521* (2013.01); *H01Q 5/378* (2015.01)

(58) Field of Classification Search
CPC ...... H01Q 21/30; H01Q 1/3275; H01Q 1/521; H01Q 5/378; H01Q 5/307; H01Q 5/371;
(Continued)

(56) References Cited

U.S. PATENT DOCUMENTS

| | | | | |
|---|---|---|---|---|
| 6,297,777 B1 * | 10/2001 | Tsubaki | ............... | H01Q 9/0414 343/702 |
| 6,476,767 B2 * | 11/2002 | Aoyama | ............. | H01Q 9/0442 343/702 |

(Continued)

FOREIGN PATENT DOCUMENTS

| | | |
|---|---|---|
| CN | 104701623 A | 6/2015 |
| CN | 108565543 A | 9/2018 |

(Continued)

OTHER PUBLICATIONS

Libin Sun et al:"Compact 5G Mimo Mobile Phone Antennas With Tightly Arranged Orthogonal-Mode Pairs." IEEE Transactions on Antennas and Propagation, vol. 66, No. 11, Nov. 2018. total 6 pages.
(Continued)

*Primary Examiner* — Dameon E Levi
*Assistant Examiner* — Anh N Ho
(74) *Attorney, Agent, or Firm* — WOMBLE BOND DICKINSON (US) LLP

(57) ABSTRACT

An antenna comprises a first radiator, a second radiator, a third radiator located on a printed circuit board PCB. Operating frequency bands of the first radiator and the second radiator comprise a first frequency band, a resonance frequency band generated by the third radiator comprises the first frequency band. A current on the first radiator is orthogonal to a current on the second radiator, and a distance between the first radiator, the second radiator, and the third
(Continued)

radiator is less than a half of a first wavelength, wherein the first wavelength is a wavelength corresponding to the first frequency band.

20 Claims, 12 Drawing Sheets

(51) Int. Cl.
*H01Q 1/52* (2006.01)
*H01Q 5/378* (2015.01)

(58) Field of Classification Search
CPC .......... H01Q 7/00; H01Q 9/0421; H01Q 9/42; H01Q 21/28; H01Q 1/52; H01Q 5/28
See application file for complete search history.

(56) References Cited

U.S. PATENT DOCUMENTS 9,786,994 B1 * 10/2017 Lee .................... H01Q 21/0006
2009/0096699 A1 4/2009 Chiu et al.
2010/0123616 A1 * 5/2010 Minami ................. H01Q 21/08 342/147
2010/0315313 A1 * 12/2010 Wu ...................... H01Q 1/2291 343/893
2019/0107617 A1 4/2019 Crowley
2020/0185819 A1 * 6/2020 Kim ..................... H01Q 1/3208
2020/0321713 A1 10/2020 Khripkov et al.
2020/0335854 A1 10/2020 Yang et al.
2020/0395661 A1 12/2020 Bai et al.

FOREIGN PATENT DOCUMENTS

CN 208368727 U * 1/2019
CN 110112584 A 8/2019
WO WO-2022210699 A1 * 10/2022 ........... H01Q 1/3275

OTHER PUBLICATIONS

Hang Xu et al:"A Highly Integrated MIMO Antenna Unit: Differential/Common Mode Design." IEEE Transactions on Antennas and Propagation, vol. 67, No. 11, Nov. 2019. total 11 pages.

* cited by examiner (a)

(b)

ANTENNA AND TERMINAL DEVICE

CROSS-REFERENCE TO RELATED APPLICATIONS

This application is a National Stage of International Application No. PCT/CN2022/083410, filed on Mar. 28, 2022, which claims priority to Chinese Patent Application No. 202110341374.X, filed on Mar. 30, 2021, both of which are hereby incorporated by reference in their entireties.

TECHNICAL FIELD

This application relates to the field of wireless communication, and in particular, to an antenna and a terminal device.

BACKGROUND

With rapid application of a 5th generation mobile communication technology (5G), a vehicle to everything (V2X) technology, and the like to a vehicle, an increasing quantity of antennas need to be disposed on the vehicle, including a 4G/5G antenna, a global navigation satellite system (GNSS) antenna, a V2X antenna, a Bluetooth low energy (BLE) antenna, a wireless fidelity (Wi-Fi) antenna, a remote keyless entry (RKE) antenna, and the like. In addition to an original quantity of antennas, a plurality of antennas still need to be added to meet a communication requirement. However, adding an antenna of another frequency band to space in which an original antenna is located causes deterioration of isolation between antennas. Alternatively, a newly added antenna may be disposed in other space of the vehicle, but this causes an increase in a quantity of radio frequency cables, and causes a sharp increase in costs. Therefore, how to add an antenna of another frequency band to space in which an original antenna is located becomes a pain point in the industry.

SUMMARY

This application provides an antenna and a terminal device. In original space, a distance between antenna units operating in a same frequency band in an antenna is far less than a half of an operating wavelength. More space saved may be used to deploy antenna units operating in another frequency band, so that a larger quantity of antennas can be deployed in the original space, to meet a communication requirement.

According to a first aspect, an antenna is provided. The antenna includes: a first radiator, a second radiator, a third radiator, and a printed circuit board (PCB). The first radiator, the second radiator, and the third radiator are located on the PCB; operating frequency bands of the first radiator and the second radiator include a first frequency band; a resonance frequency band generated by the third radiator includes the first frequency band; a current on the first radiator is orthogonal to a current on the second radiator; and a distance between the first radiator, the second radiator, and the third radiator is less than a half of a first wavelength, and the first wavelength is a wavelength corresponding to the first frequency band.

According to the technical solution in this embodiment of this application, a first antenna unit includes the first radiator, a second antenna unit includes the second radiator, and a third antenna unit includes the third radiator. A layout manner of the first antenna unit and the second antenna unit whose operating frequency bands both include the first frequency band is changed, so that the currents on the radiators of the first antenna unit and the second antenna unit are orthogonal. However, because the currents on the radiators of the two antenna units are orthogonal, coupling between the two antenna units can be effectively reduced. Therefore, a distance between the first antenna unit and the second antenna unit is reduced while good isolation is maintained, so that a larger quantity of antenna units may be disposed in original antenna layout space. In addition, the third antenna unit whose operating frequency band includes the first frequency band may be disposed near the first antenna unit and the second antenna unit, and the third radiator of the third antenna unit may be coupled to energy of the first radiator and energy of the second radiator, to further improve isolation between the first antenna unit and the second antenna unit.

With reference to the first aspect, in some embodiments of the first aspect, the first radiator is perpendicular to the PCB; and the second radiator is parallel to the PCB.

According to the technical solution in this embodiment of this application, the layout manner of the first antenna unit and the second antenna unit whose operating frequency bands both include the first frequency band is changed, so that the currents on the radiators of the first antenna unit and the second antenna unit are orthogonal.

With reference to the first aspect, in some embodiments of the first aspect, a part of the third radiator is parallel to a part of the first radiator or a part of the second radiator.

According to the technical solution in this embodiment of this application, the third radiator may be coupled to more energy of a radiator parallel to the third radiator, to reduce the coupling between the first radiator and the second radiator, and improve the isolation between the first antenna unit and the second antenna unit.

With reference to the first aspect, in some embodiments of the first aspect, the distance between the first radiator and the second radiator is less than one eighth of the first wavelength.

According to the technical solution in this embodiment of this application, the distance between the first radiator and the second radiator may be adjusted based on an actual setting or production requirement, to adapt to different internal layouts of the antenna.

With reference to the first aspect, in some embodiments of the first aspect, the first radiator and the second radiator are respectively located on two sides of the third radiator.

According to the technical solution in this embodiment of this application, that the first radiator and the second radiator are respectively located on the two sides of the third radiator may include: The third radiator and the first radiator or the second radiator are located on a same straight line.

With reference to the first aspect, in some embodiments of the first aspect, the antenna further includes a feed unit, a feed piece, and a grounding piece; the feed piece is disposed at a first end of the second radiator, and a first slot is formed between the feed piece and the second radiator; the grounding piece is disposed at a second end of the second radiator, and a second slot is formed between the grounding member and the second radiator; the feed piece is electrically connected to the feed unit; and the grounding piece is electrically connected to the PCB.

According to the technical solution in this embodiment of this application, the foregoing feed manner can ensure that when a second feed unit performs feeding, currents on the second radiator are in a same direction, and no current reverse point is generated, to ensure that the current on the second radiator is orthogonal to the current on the first radiator.

With reference to the first aspect, in some embodiments of the first aspect, the antenna further includes a first capacitor and a second capacitor; the first capacitor is disposed in the first slot, one end of the first capacitor is electrically connected to the second radiator, and the other end is electrically connected to the feed piece; and the second capacitor is disposed in the second slot, one end of the second capacitor is electrically connected to the second radiator, and the other end is electrically connected to the grounding piece.

According to the technical solution in this embodiment of this application, capacitance values of the first capacitor and the second capacitor may be adjusted based on an actual operating frequency band. For example, the capacitance values of the first capacitor and the second capacitor may range from 0.1 pF to 10 pF.

With reference to the first aspect, in some embodiments of the first aspect, the antenna further includes a dielectric layer; the second radiator is disposed on an upper surface of the dielectric layer; and the feed piece and the grounding point are disposed on different side surfaces of the dielectric layer.

With reference to the first aspect, in some embodiments of the first aspect, the antenna further includes a parasitic branch, and the parasitic branch is disposed on a side surface of the dielectric layer.

According to the technical solution in this embodiment of this application, the parasitic branch may generate a new resonance when the second feed unit performs feeding, so that a bandwidth of the second antenna unit can be extended. In addition, in a frequency band corresponding to the resonance generated by the parasitic branch, good isolation can still be maintained between the first antenna unit and the second antenna unit.

With reference to the first aspect, in some embodiments of the first aspect, the second radiator includes a first bending region, and the second radiator in the first bending region is bent.

According to the technical solution in this embodiment of this application, a radiator in the first bending region is bent, so that an electrical length of the second radiator can be increased, and an area occupied by the second radiator can be reduced.

With reference to the first aspect, in some embodiments of the first aspect, the first radiator is a radiator of a monopole antenna.

With reference to the first aspect, in some embodiments of the first aspect, the third radiator includes a second bending region, and the third radiator in the second bending region is bent.

According to the technical solution in this embodiment of this application, a radiator in the second bending region is bent, so that an electrical length of the third radiator can be increased, and an area occupied by the third radiator can be reduced.

With reference to the first aspect, in some embodiments of the first aspect, an operating frequency band of the third radiator includes 5905 MHz to 5925 MHz.

According to the technical solution in this embodiment of this application, the third antenna unit may be used as a vehicle to everything technology antenna.

With reference to the first aspect, in some embodiments of the first aspect, the first frequency band is 824 MHz to 960 MHz.

According to the technical solution in this embodiment of this application, the first frequency band may be 824 MHz to 960 MHz, and corresponds to a low frequency band in a communication frequency band. Alternatively, the first frequency band may be 1710 MHz to 2690 MHz, and corresponds to an intermediate frequency band in the communication frequency band. Alternatively, the first frequency band may be 3300 MHz to 5000 MHz, and corresponds to a high frequency band in the communication frequency band.

With reference to the first aspect, in some embodiments of the first aspect, the antenna is a vehicle-mounted antenna.

According to the technical solution in this embodiment of this application, an example in which the antenna is a shark fin antenna in a vehicle is used for description, and may be used in another terminal device.

According to a second aspect, a terminal device is provided. The terminal device includes the antenna according to the first aspect.

With reference to the second aspect, in some embodiments of the second aspect, the antenna is disposed on a shark-fin shaped part on a vehicle roof.

DESCRIPTION OF EMBODIMENTS

The following describes the technical solutions of this application with reference to the accompanying drawings.

Figure 1:
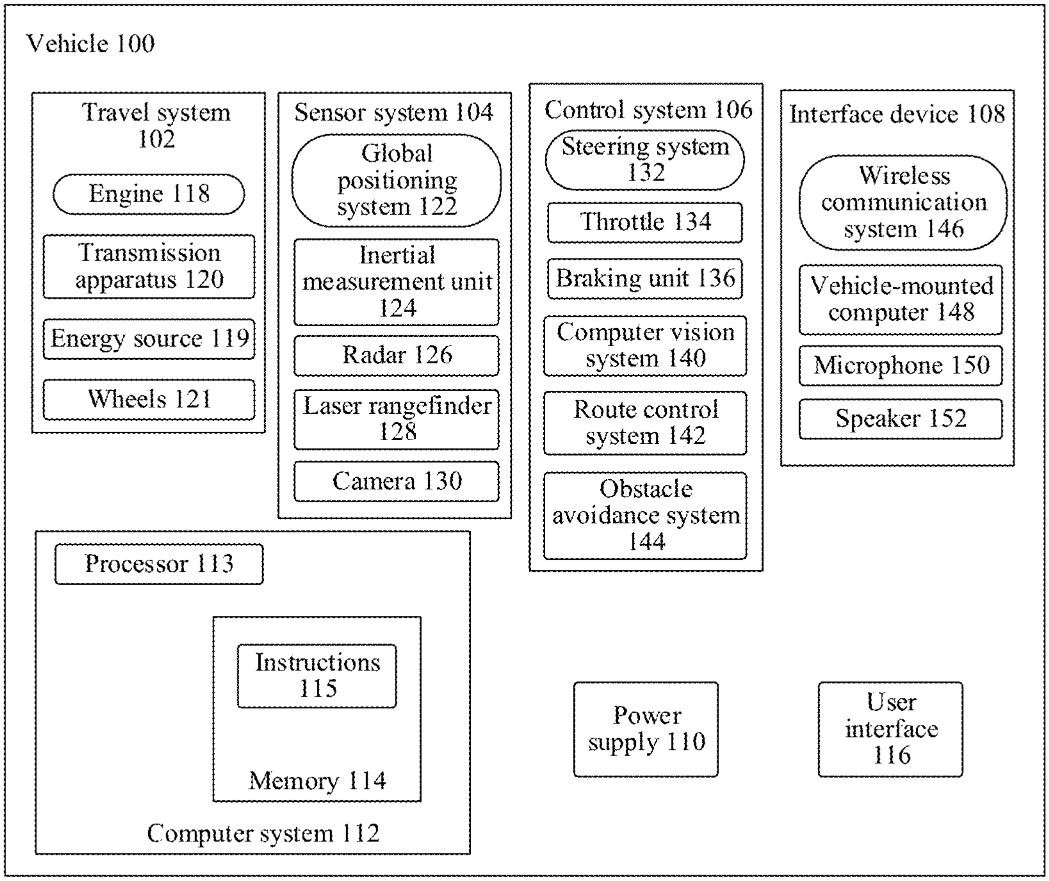
FIG. 1 is a functional block diagram of a vehicle to which an embodiment of this application is applicable.

FIG. 1 is a functional block diagram of a vehicle 100 according to an embodiment of the present disclosure. In an embodiment, the vehicle 100 is configured to be in a fully or partially autonomous driving mode. For example, the vehicle 100 in an autonomous driving mode may control the vehicle 100, and may determine current states of the vehicle and an ambient environment of the vehicle through a manual operation, determine possible behavior of at least one other vehicle in the ambient environment, determine a confidence level corresponding to a possibility that the other vehicle performs the possible behavior, and control the vehicle 100 based on determined information. When the vehicle 100 is in the autonomous driving mode, the vehicle 100 may be set to operate without interacting with a person.

The vehicle 100 may include various subsystems, for example, a travel system 102, a sensor system 104, a control system 106, one or more interface devices 108, a power supply 110, a computer system 112, and a user interface 116. In an embodiment, the vehicle 100 may include more or fewer subsystems, and each subsystem may include a plurality of components. In addition, each subsystem and component of the vehicle 100 may be interconnected in a wired or wireless manner.

The travel system 102 may include a component that provides power for the vehicle 100 to move. In an embodiment, the travel system 102 may include an engine 118, an energy source 119, a transmission apparatus 120, and wheels/tires 121. The engine 118 may be an internal combustion engine, an electric motor, an air compression engine, or another type of engine combination, for example, a hybrid engine including a gas-oil engine and an electric motor, or a hybrid engine including an internal combustion engine and an air compression engine. The engine 118 converts the energy source 119 into mechanical energy.

The sensor system 104 may include several sensors that can sense information about the ambient environment of the vehicle 100. For example, the sensor system 104 may include a positioning system 122 (where the positioning system may be a GPS system, a BeiDou system, or another positioning system), an inertial measurement unit (IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of these sensors can be used to detect an object and corresponding features (a position, a shape, a direction, a speed, and the like) of the object. Such detection and recognition are key functions for a safe operation of the autonomous driving vehicle 100.

The control system 106 controls operations of the vehicle 100 and components of the vehicle 100. The control system 106 may include various components, including a steering system 132, a throttle 134, a braking unit 136, a sensor fusion algorithm 138, a computer vision system 140, a route control system 142, and an obstacle avoidance system 144.

The vehicle 100 interacts with an external sensor, another vehicle, another computer system, or a user by using the interface device 108. The interface device 108 may include a wireless communication system 146, a vehicle-mounted computer 148, a microphone 150, and/or a speaker 152.

In some embodiments, the interface device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive a user input. The vehicle-mounted computer 148 may perform operations through a touchscreen. In another case, the interface device 108 may provide a means for the vehicle 100 to communicate with another device located in the vehicle. For example, the microphone 150 may receive an audio (for example, a voice command or another audio input) from the user of the vehicle 100. Likewise, the speaker 152 may output an audio to the user of the vehicle 100.

The wireless communication system 146 may wirelessly communicate with one or more devices directly or through a communication network. For example, the wireless communication system 146 implements wireless communication by using a vehicle-mounted antenna, for example, 3G cellular communication, a global system for mobile communications (GSM) communication technology, a wideband code division multiple access (WCDMA) communication technology, 4G cellular communication (for example, a long term evolution (LTE) communication technology), or 5G cellular communication. The wireless communication system 146 may communicate with a wireless local area network (WLAN) through Wi-Fi by using the vehicle-mounted antenna. In some embodiments, the wireless communication system 146 may communicate directly with a device through an infrared link or by using Bluetooth or Zigbee. Other wireless protocols, for example, various vehicle communication systems, such as the wireless communication system 146, may include one or more dedicated short range communication (DSRC) devices, and these devices may include public and/or private data communication between vehicles and/or roadside stations.

Some or all of functions of the vehicle 100 are controlled by the computer system 112. The computer system 112 may include at least one processor 113. The processor 113 executes instructions 115 stored in a non-transient computer-readable medium such as a data storage apparatus 114. The computer system 112 may alternatively be a plurality of computing devices that control an individual component or a subsystem of the vehicle 100 in a distributed manner.

The user interface 116 is used to provide information for or receive information from the user of the vehicle 100. In an embodiment, the user interface 116 may include one or more input/output devices within a set of interface devices 108, such as the wireless communication system 146, the vehicle-mounted computer 148, the microphone 150, and the speaker 152.

In an embodiment, one or more of the foregoing components may be installed separately from or associated with the vehicle 100. For example, the data storage apparatus 114 may be partially or completely separated from the vehicle 1100. The foregoing components may be communicatively coupled together in a wired and/or wireless manner.

In an embodiment, the foregoing components are merely examples. During actual application, components in the foregoing modules may be added or removed based on an actual requirement. FIG. 1 should not be construed as a limitation on embodiments of the present disclosure.

The vehicle 100 may be a car, a truck, a motorcycle, a bus, a boat, an airplane, a helicopter, a lawn mower, a recreational vehicle, a playground vehicle, a construction device, a trolley, a golf cart, a train, a cart, or the like. This is not limited in embodiments of the present disclosure.

Figure 3:
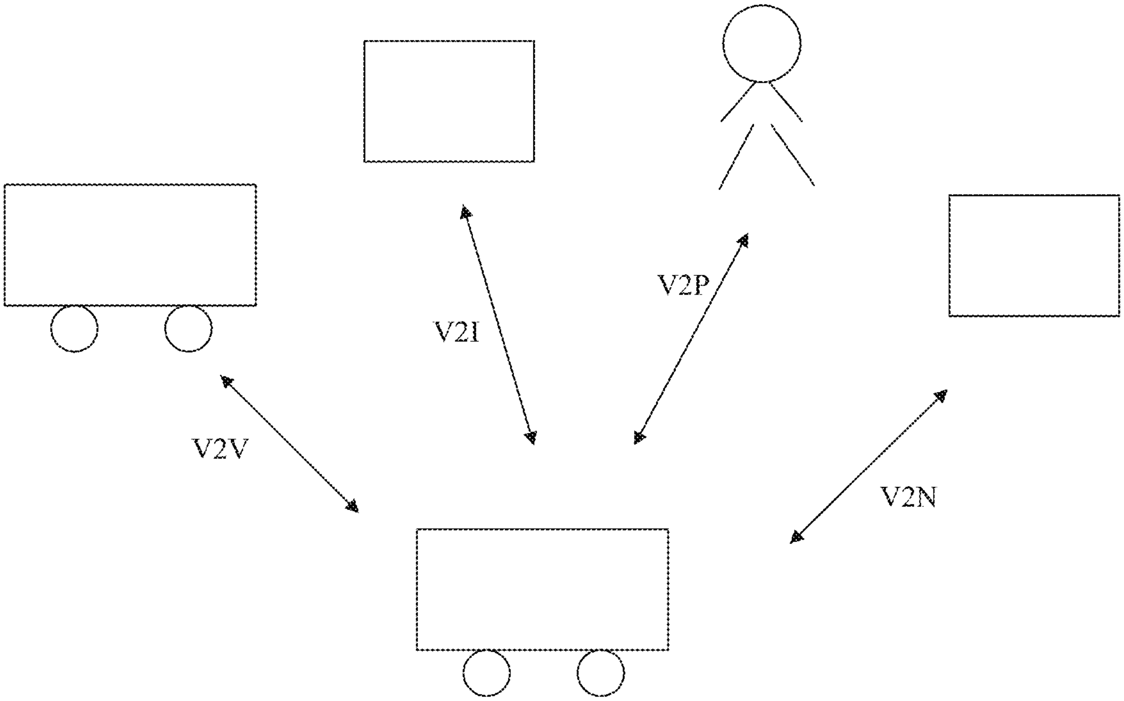
FIG. 3 is a schematic diagram of a V2X scenario according to an embodiment of this application.

With development of communication technologies, an increasing quantity of antennas need to be disposed on a vehicle. In the 5G era, a vehicle-mounted antenna needs to include a 4G/5G antenna, a GNSS antenna, a V2X antenna, a BLE antenna, a Wi-Fi antenna, an RKE antenna, and the like. For example, the V2X antenna may be used in a V2X system for communication in the system, for example, vehicle to vehicle (V2V), vehicle to infrastructure (V2I), vehicle to people (V2P), and vehicle to network (V2N), as shown in FIG. 3. The V2V indicates that a vehicle may directly communicate with another vehicle, and the vehicle may be used as a mobile communication terminal, and may have a capability of receiving and sending basic vehicle body data. The V2I indicates that a vehicle communicates with a surrounding infrastructure, for example, may communicate with a traffic light or a roadside device at a crossroad. The V2P indicates that a vehicle may also communicate with a person, and may mainly communicate with a wearable device, a mobile phone, a computer, or the like on the person. The V2N indicates that a vehicle communicates with an edge cloud. For example, when there is a blind zone for vehicles traveling in different directions at a crossroad, an accident may occur if two vehicles do not decelerate at the crossroad. If there is a building between the two vehicles, the edge cloud may receive basic vehicle body data of the two vehicles by using a roadside device, and then deliver a computing result to the vehicles by using the roadside device, to warn drivers. The 4G/5G antenna may be used for communication between a vehicle and a cellular network, for example, may make a voice call. The GNSS antenna may be used for communication between a vehicle and a positioning satellite, and may obtain current location information of a vehicle. The Wi-Fi antenna may be used for communication between a vehicle and a terminal device in a same Wi-Fi environment, to exchange data. The BLE antenna may be used for communication between a vehicle and a terminal device using Bluetooth, to exchange data. The RKE antenna may be used for communication between a vehicle and a key used by the vehicle, so that a user may use a keyless entry function.

In addition to an original quantity of antennas, a plurality of antennas still need to be added to meet a communication requirement. However, adding an antenna of another frequency band to space in which an original antenna is located causes deterioration of isolation between antennas. Especially, for antennas operating in a same frequency band, for example, a multiple input multiple output (MIMO) antenna in 5G, a distance between the antennas usually needs to be greater than a half of an operating wavelength. Alternatively, a newly added antenna may be disposed in other space of the vehicle. However, this causes an increase in a quantity of radio frequency cables, and causes a sharp increase in costs.

Figure 2:
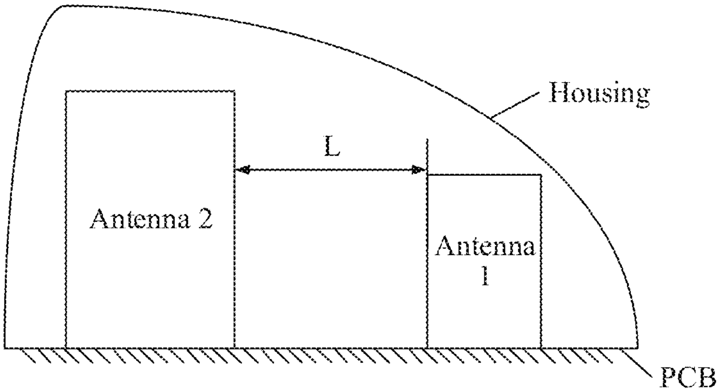
FIG. 2 is a diagram of a structure of an antenna in the related technology according to an embodiment of this application.

FIG. 2 is a diagram of a structure of an antenna in the related technology according to an embodiment of this application.

As shown in FIG. 2, an antenna 1 and an antenna 2 are located in space formed by a housing and a printed circuit board (PCB). When the antenna 1 and the antenna 2 operate in a same frequency band, to ensure good isolation between the two antennas, a distance L between the antenna 1 and the antenna 2 generally needs to be greater than a half of a wavelength corresponding to the operating frequency band, where the wavelength corresponding to the operating frequency band may be understood as a wavelength corresponding to a center frequency of the operating frequency band of the antenna 1 and the antenna 2, or may be considered as a wavelength corresponding to a resonance point. For example, for 900 MHz, to ensure good isolation between the antenna 1 and the antenna 2, the distance L between the antenna 1 and the antenna 2 needs to be greater than 170 mm. In an increasingly compact antenna layout, it is difficult to meet such a distance.

Embodiments of this application provide an antenna, so that a distance between antenna units operating in a same frequency band in an antenna in original space is less than a half of an operating wavelength. More space saved may be used to deploy antenna units operating in another frequency band, so that a larger quantity of antennas can be deployed in the original space, to meet a communication requirement.

Figure 4:
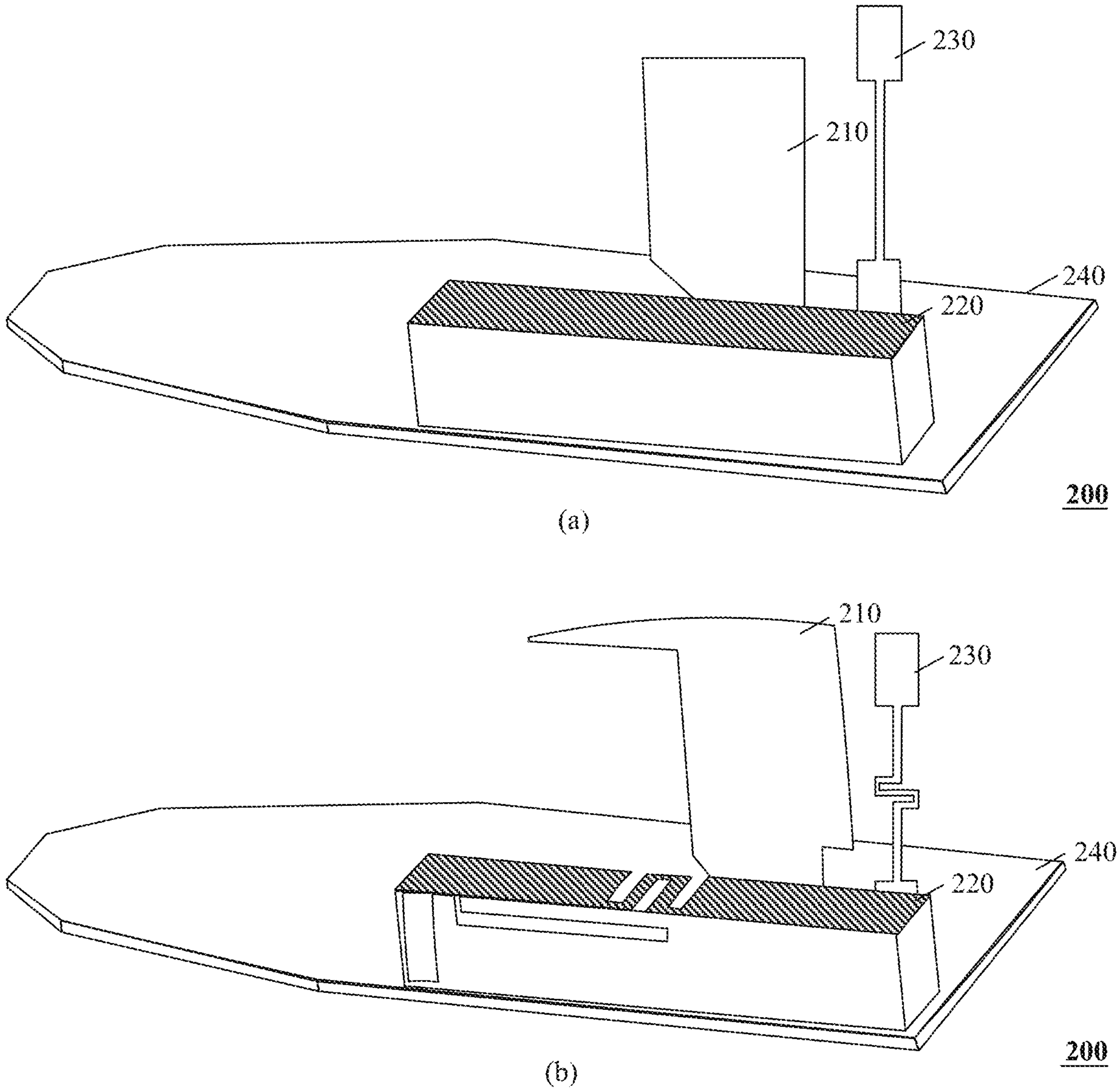
FIG. 4 is a diagram of a three-dimensional structure of an antenna 200 according to an embodiment of this application.
Figure 5:
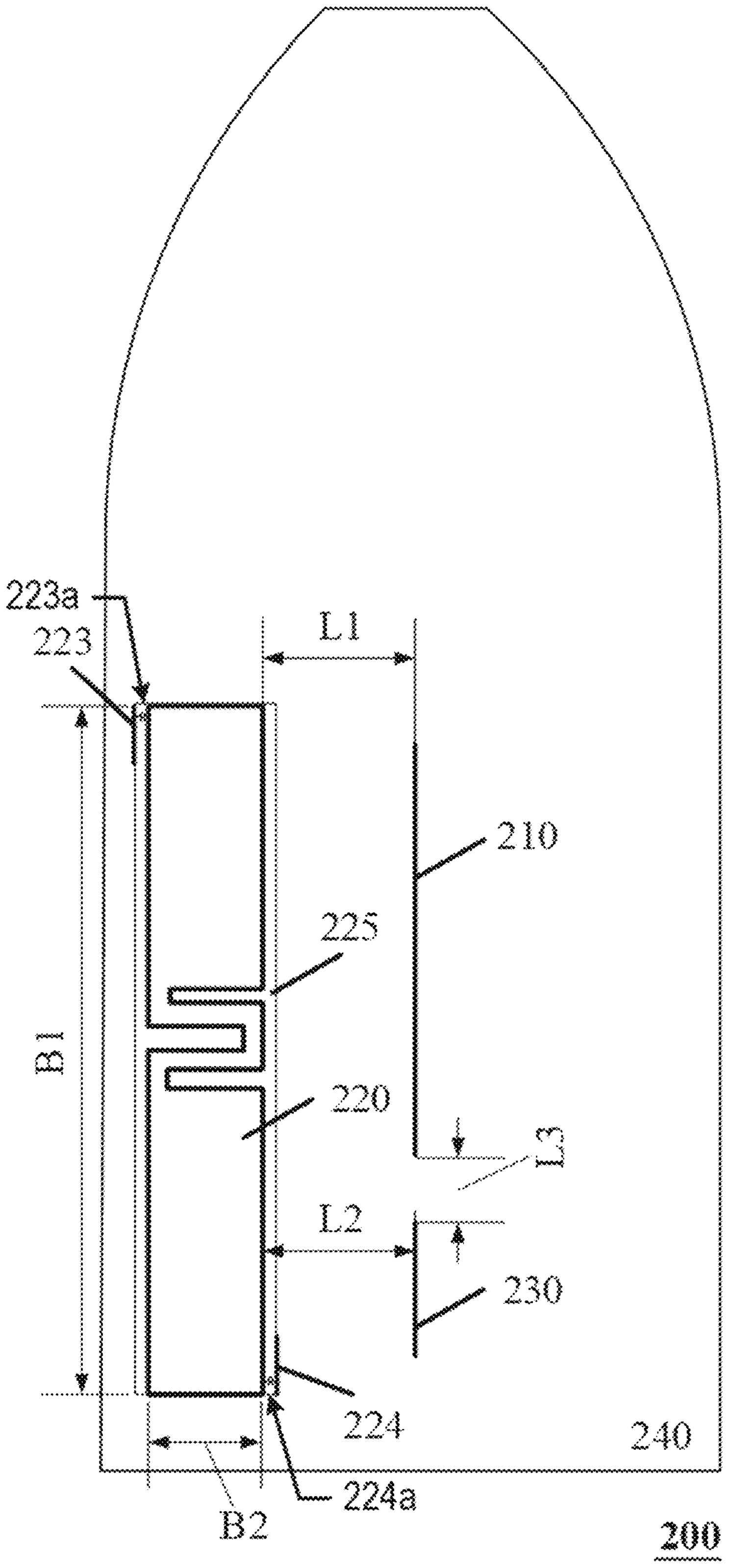
FIG. 5 is a top view of the antenna 200 according to an embodiment of this application.
Figure 6:
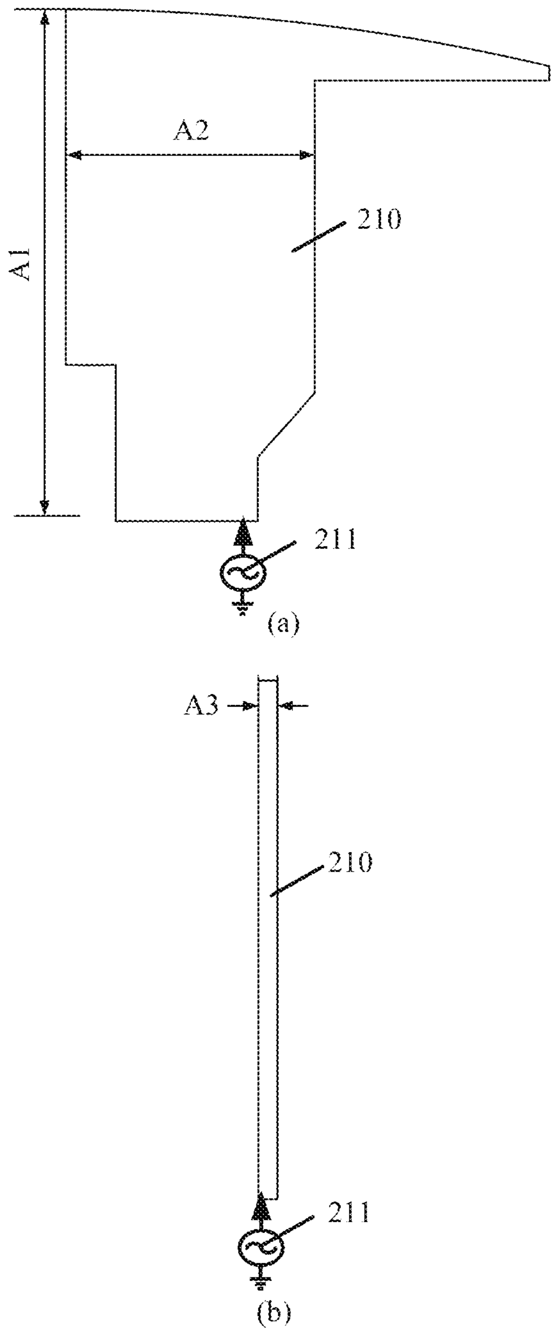
FIG. 6 is a schematic diagram of a structure of a first antenna unit according to an embodiment of this application.
Figure 7:
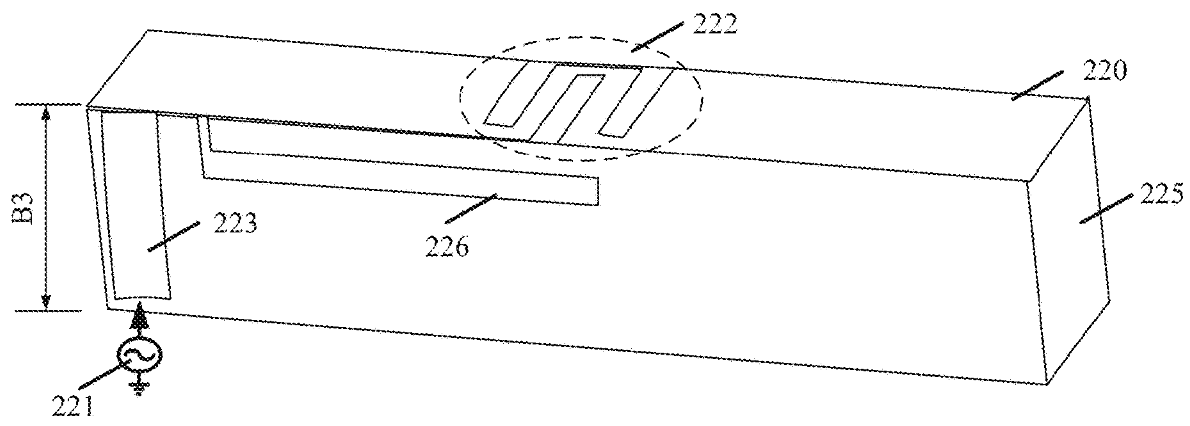
FIG. 7 is a schematic diagram of a structure of a second antenna unit according to an embodiment of this application.
Figure 8:
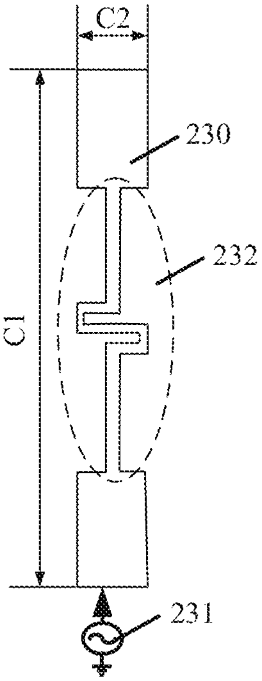
FIG. 8 is a schematic diagram of a structure of a third antenna unit according to an embodiment of this application.
Figure 8:
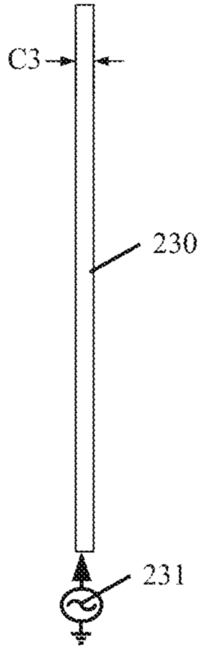

FIG. 4 to FIG. 8 each are a schematic diagram of a structure of an antenna according to an embodiment of this application. The antenna may be disposed in the space formed by the housing and the printed circuit board PCB shown in FIG. 2. Herein, (a) and (b) in FIG. 4 each are a schematic diagram of a three-dimensional structure of an antenna 200. FIG. 5 is a top view of the antenna 200 shown in (b) in FIG. 4. FIG. 6 is a schematic diagram of a structure of a first antenna unit shown in (b) in FIG. 4. FIG. 7 is a schematic diagram of a structure of a second antenna unit shown in (b) in FIG. 4. FIG. 8 is a schematic diagram of a structure of a third antenna unit shown in (b) in FIG. 4.

It should be understood that the antenna 200 provided in this application is described by using a shark fin antenna in a vehicle as an example. The technical solutions provided in embodiments of this application may also be applied to another terminal device. For example, the technical solutions provided in this application are applicable to a terminal device that uses one or more of the following communication technologies: a Bluetooth (BT) communication technology, a global positioning system (GPS) communication technology, a Wi-Fi communication technology, a GSM communication technology, a WCDMA communication technology, an LTE communication technology, a 5G communication technology, another future communication technology, and the like. The terminal device/electronic device in embodiments of this application may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a terminal device in a 5G network, a terminal device in a future evolved public land mobile network (PLMN), or the like. This is not limited in embodiments of this application.

As shown in (a) in FIG. 4, the antenna 200 may include a first radiator 210, a second radiator 220, a third radiator 230, and a PCB 240. As shown in (b) in FIG. 4, a difference from (a) in FIG. 4 is that shapes of the first radiator 210, the second radiator 220, and the third radiator 230 are different. For details, refer to descriptions in FIG. 5 to FIG. 8, and details are not described herein. The shapes of the first radiator 210, the second radiator 220, and the third radiator 230 may be adjusted based on a design. This is not limited in this application.

The first radiator 210, the second radiator 220, and the third radiator 230 are located on the PCB 240. The first antenna unit includes the first radiator 210, the second antenna unit includes the second radiator 220, the third antenna unit includes the third radiator 230, and operating frequency bands of the first antenna unit and the second antenna unit both include a first frequency band. The operating frequency bands may be understood as a set of frequencies that may be used by an antenna unit for communication, or may be understood as a frequency band that meets a requirement in a resonance generated by an antenna unit, for example, a frequency range covered by the resonance generated by the antenna unit when a reflection coefficient is less than −10 dB or −6 dB, and/or efficiency is greater than −3 dB. This is not limited in this application, and may be adjusted based on an actual design requirement. A resonance frequency band generated by the third antenna unit includes the first frequency band. This may be understood as that a frequency band width of a resonance generated when the third antenna unit operates is greater than a width of the first frequency band, in other words, the first frequency band is included in the resonance frequency band generated by the third unit. When the first antenna unit and the second antenna unit operate, a current on the first radiator 210 is orthogonal to a current on the second radiator 220 (for example, a phase difference between the current on the first radiator 210 and the current on the second radiator 220 is 80° to 100°. A distance between the first radiator, the second radiator, and the third radiator is less than a half of a first wavelength, and the first wavelength is a wavelength corresponding to the first frequency band. The first wavelength may be considered as a wavelength corresponding to a center frequency of the first frequency band, or may be considered as a wavelength corresponding to a resonance point generated by the antenna unit in the first frequency band.

According to the antenna provided in embodiments of this application, a larger quantity of antenna units may be disposed in original layout space. In particular, for an antenna unit operating in a low frequency band, a wavelength corresponding to the low frequency band is long. When a plurality of antenna units operate in the low frequency band, a longer interval is usually needed to ensure isolation between the antenna units. In the antenna provided in embodiments of this application, a layout manner of the first antenna unit and the second antenna unit whose operating frequency bands both include the first frequency band is changed, so that the currents on the radiators of the first antenna unit and the second antenna unit are orthogonal. However, because the currents on the radiators of the two antenna units are orthogonal, coupling between the two antenna units can be effectively reduced. Therefore, a distance between the first antenna unit and the second antenna unit is reduced while good isolation is maintained, so that a larger quantity of antenna units may be disposed in the original antenna layout space. In addition, the third antenna unit whose resonance frequency band includes the first frequency band may be disposed near the first antenna unit and the second antenna unit, and the third radiator of the third antenna unit may be separately coupled to energy of the first radiator and energy of the second radiator in the first frequency band, to reduce energy coupled between the first radiator and the second radiator, and further improve isolation between the first antenna unit and the second antenna unit.

It should be understood that, that the current on the first radiator 210 is orthogonal to the current on the second radiator 220 may be understood as that a current greater than a first threshold on the first radiator 210 is orthogonal to a current greater than the first threshold on the second radiator 220. For example, the first threshold may be 60% or 70%. As an orthogonal proportion of the current on the first radiator 210 and the current on the second radiator 220 increases, better isolation between the first antenna unit and the second antenna unit is achieved. In addition, the distance between the first radiator, the second radiator, and the third radiator may be understood as a straight-line distance between points that are closest to each other on the radiators.

In an embodiment, the first antenna unit and the second antenna unit may be used as a 4G/5G antenna in a vehicle-mounted antenna, and may be used for communication between a vehicle and a cellular network. The third antenna unit may be used as a V2X antenna in the vehicle-mounted antenna, and may be used for communication with another vehicle, infrastructure, person, or cloud.

In an embodiment, the first frequency band may be 824 MHz to 960 MHz, and corresponds to a low frequency band in a communication frequency band. Alternatively, the first frequency band may be 1710 MHz to 2690 MHz, and corresponds to an intermediate frequency band in the communication frequency band. Alternatively, the first frequency band may be 3300 MHz to 5000 MHz, and corresponds to a high frequency band in the communication frequency band. It should be understood that operating frequency bands of the first antenna unit, the second antenna unit, and the third antenna unit may further include another frequency band. For example, the first antenna unit and the second antenna unit may be used as the 4G/5G antenna in the vehicle-mounted antenna, and may simultaneously operate in 824 MHz to 960 MHz, 1710 MHz to 2690 MHz, and 3300 MHz to 5000 MHz. The third antenna unit may be used as the V2X antenna in the vehicle-mounted antenna, and operate in 5905 MHz to 5925 MHz.

In an embodiment, at least a part of the third radiator 230 may be parallel to at least a part of the first radiator 210 or at least a part of the second radiator 220, and the part of the third radiator 230 may be coupled to energy of a radiator parallel to the third radiator 230, so that the coupling between the first radiator 210 and the second radiator 200 is further reduced, and the isolation between the first antenna unit and the second antenna unit is improved. In an embodiment, the whole third radiator 230 is basically parallel to the first radiator 210, and coupling generated between the third radiator 230 and the first radiator 210 may reduce the coupling between the first radiator 210 and the second radiator 220.

In an embodiment, as shown in FIG. 5, the distance between the first radiator 210 and the second radiator 220 is L1, the distance between the second radiator 220 and the third radiator 230 is L2, and the distance between the first radiator 210 and the third radiator 230 is L3, where all of the distance L1, the distance L2, and the distance L3 may be less than one eighth of the first wavelength. In an embodiment, the distances L1 and L2 may be less than one sixteenth of the first wavelength, or less than one twentieth of the first wavelength, or less than one twenty-fifth of the first wavelength. In an embodiment of this application, an example in which L1=L2=12 mm is used for description. For a low frequency band, for example, 900 MHz, the distance is equivalent to 0.035 times of a corresponding wavelength, and may be adjusted based on actual production or designs. In addition, the distance L3 may be adjusted to adjust the isolation between the first antenna unit and the second antenna unit.

In an embodiment, the first radiator 210 and the second radiator 220 are respectively located on two sides of the third radiator 230. It should be understood that, that the first radiator 210 and the second radiator 220 are respectively located on the two sides of the third radiator 230 may include: The third radiator 230 and the first radiator 210 or the second radiator 220 are located on a same straight line. As shown in FIG. 5, in this embodiment of this application, an example in which the third radiator 230 and the first radiator 210 are located on the same straight line is used for description, and this may be adjusted based on actual production or designs.

As shown in (a) in FIG. 6, because the antenna provided in this embodiment of this application is a shark fin antenna in a vehicle, and the housing shown in FIG. 2 limits a height, the first radiator 210 may be bent at one end away from the PCB and extend along a direction parallel to a plane on which the PCB is located. Therefore, a larger electrical length may be obtained in space in which the antenna is located. Alternatively, the first radiator 210 may be bent at one end away from the PCB, and extend along an inner side of the top of the housing, to meet an electrical length requirement. In another embodiment, based on different housings outside the vehicle-mounted antenna, a shape of the first radiator may be adjusted, to meet the electrical length requirement. This is not limited in this application.

In an embodiment, the antenna may further include a first feed unit 211 that may perform feeding at one end of the first radiator 210 close to the PCB. In this feed manner, the first antenna unit is a monopole antenna. This is merely used as an example, and may be adjusted based on a design or production requirement during actual application.

It should be understood that the electrical length may be expressed by a physical length (namely, a mechanical length or a geometric length) multiplied by a ratio of a transmission time length of an electrical or electromagnetic signal in a medium to a time length required for transmitting the signal by a distance the same as the physical length of the medium in free space. The electrical length may satisfy the following formula:

$$\bar{L} = L \times \frac{a}{b}.$$

L is the physical length, a is the transmission time length of the electrical or electromagnetic signal in the medium, and b is the transmission time length in the free space.

Alternatively, the electrical length may be a ratio of a physical length (namely, a mechanical length or a geometric length) to a wavelength of a transmitted electromagnetic wave, and the electrical length may satisfy the following formula:

$$\bar{L} = \frac{L}{\lambda}.$$

L is the physical length, and λ is the wavelength of the electromagnetic wave.

In an embodiment, when the first antenna unit is a monopole antenna, an electrical length of the first radiator 210 may be one fourth of an operating wavelength of the first radiator 210. In this embodiment of this application, for brevity of description, as shown in (a) in FIG. 6, an example in which a length A1 of the first radiator 210 is 55 mm and a width A2 is 35 mm is used for description. As shown in (b) in FIG. 6, an example in which a thickness A3 of the first radiator 210 is 1.2 mm is used for description, and this may be adjusted based on an actual operating frequency band.

As shown in FIG. 5, the antenna 200 may further include a feed piece 223 and a grounding piece 224. The feed piece 223 is disposed at a first end of the second radiator 220, and a first slot is formed between the feed piece 223 and the second radiator 220. The grounding piece 224 is disposed at a second end of the second radiator 220, and a second slot is formed between the grounding piece 224 and the second radiator 220. The grounding piece 224 may be electrically connected to a metal layer in the PCB 240, and the metal layer in the PCB is used as a reference ground, to implement grounding of the second antenna unit.

As shown in FIG. 7, the second radiator 220 may have a rectangular structure, and is disposed in parallel to the PCB. A first bending region 222 may be provided on the second radiator 220, and a radiator in the first bending region 222 is bent, for example, bent in an extension direction of the second radiator, which may be in a fold-line shape, a Z shape, an S shape, or the like. This is not limited in this application. An electrical length of the second radiator 220 may be adjusted by bending a part of the second radiator 220. For example, the electrical length of the second radiator 220 is increased without increasing a physical size.

In an embodiment, the antenna may further include a second feed unit 221. The second feed unit 221 may feed the second radiator 220 by electrically connecting to the feed piece 223.

In an embodiment, as shown in FIG. 5 and FIG. 7, the second feed unit 221 may feed the second radiator 220 in an indirect coupling manner through the first slot formed between the feed piece 223 and the second radiator 220. Alternatively, the antenna may include a first capacitor 223*a*. The first capacitor 223*a* may be connected in series between the feed piece 223 and the second radiator 220, and is located in the first slot. In this manner, the second feed unit 221 may feed the second radiator 220 in a direct feed manner.

In an embodiment, as shown in FIG. 5, the second feed unit 221 may be grounded in an indirect coupling manner through the second slot formed between the grounding piece 224 and the second radiator 220. Alternatively, the antenna may include a second capacitor 224*a*. The second capacitor 224*a* may be connected in series between the grounding piece and the second radiator 220, and is located in the second slot. In this manner, the second radiator 220 may be grounded in a direct electrical connection manner.

It should be understood that, when the second feed unit 221 feeds the second radiator 220, for example, in the foregoing feed manner, currents on the second radiator 220 are in a same direction, and no current reverse point is generated, to ensure that the current on the second radiator is orthogonal to the current on the first radiator. It should be understood that, in this embodiment of this application, based on a structure of the antenna unit, the current on the second radiator 220 is parallel to the PCB, and is orthogonal to the current on the first radiator 210. Alternatively, another feed structure and another grounding structure may be used, so that the current on the second radiator 220 is parallel to the PCB. This is not limited in this application.

In an embodiment, in this embodiment of this application, for brevity of description, an example in which capacitance values of the first capacitor and the second capacitor are 0.3 pF is used for description, and this may be adjusted based on an actual operating frequency band. For example, the capacitance values of the first capacitor and the second capacitor may range from 0.1 pF to 10 pF.

In an embodiment, the antenna may further include a dielectric layer 225 that may be configured to support the second radiator 220. As shown in FIG. 5, the second radiator 220 may be disposed on an upper surface of the dielectric layer 225. The feed piece 223 and the grounding piece 224 may be respectively disposed on different side surfaces of the dielectric layer 225. The electrical length of the second radiator 220 may be changed when the feed piece 223 and the grounding piece 224 are disposed at different locations. The first slot between the feed piece 223 and the second radiator 220 and/or the second slot between the grounding piece 224 and the second radiator 220 may be formed on the upper surface or different side surfaces of the dielectric layer 225. It should be understood that a shape of the dielectric layer 225 is an example, and may be adjusted based on an actual design requirement. This is not limited in this application.

In an embodiment, the antenna may further include a parasitic branch 226. The parasitic branch 226 may be disposed on a side surface of the dielectric layer 225, and a location of the parasitic branch 226 may be determined based on an actual layout. The parasitic branch 226 may generate a new resonance when the second feed unit 221 performs feeding, and may extend a bandwidth of the second antenna unit.

In an embodiment, the second antenna unit may be a bilateral slot antenna, and the electrical length of the second radiator 20 may be one fourth of an operating wavelength of the second radiator 220. In this embodiment of this application, for brevity of description, as shown in FIG. 5, an example in which a length B1 of the second radiator 220 is 78 mm and a width B2 is 15 mm is used. As shown in FIG. 7, an example in which a thickness B3 of the dielectric layer 225 is 19 mm is used for description, and may be adjusted based on an actual operating frequency band.

As shown in (a) in FIG. 8, the third radiator 230 includes an upper radiation unit, a lower radiation unit, and middleware 232. Structures of the two radiation units are the same or similar. The middleware 232 is disposed between the two radiation units, to form a "dumbbell" structure.

In an embodiment, the antenna may further include a third feed unit 231 that may perform feeding at one end of the third radiator 230 close to the PCB.

In an embodiment, when the third antenna unit is used in a low frequency band (as a decoupling component between the first antenna unit and the second antenna unit), for example, 824 MHz to 960 MHz, a corresponding low frequency wavelength is long, and a line width of the middleware 232 is greatly different from the wavelength. In other words, a width of the middleware 232 is far less than the low frequency wavelength. Therefore, the two radiation units and the middleware 232 may be used as radiators. In this case, the third antenna unit is a monopole antenna. When the third antenna unit operates in a high frequency band, for example, 5905 MHz to 5925 MHz (a V2X frequency band), a corresponding high frequency wavelength is short, and a line width of the middleware 232 is slightly different from the wavelength. In other words, a width of the middleware 232 is close to the high frequency wavelength. Therefore, the middleware 232 may be used as a transmission line, and phases of electrical signals at two ends of the middleware 32 may be changed by changing a total length of the middleware 232 used as the transmission line, for example, prolonging or shortening the middleware 232. In this embodiment of this application, an example in which a radiator of the middleware 232 is a current inverter (where a phase difference between the electrical signals at the two ends of the middleware 232 is 180°) is used for description. In this case, when the third feed unit performs feeding, currents on the two radiation units are in a same direction, and the third antenna unit is an antenna array including the two radiation units, so that communication quality in the frequency band can be improved (for example, efficiency and a signal transmission rate are improved). This may be adjusted based on actual production or designs, and is not limited in this application.

In an embodiment, a second bending region may be provided on the middleware 232. As shown in (a) in FIG. 8, a radiator in the second bending region is bent, and an electrical length of the third radiator 230 may be adjusted. For example, the electrical length of the third radiator 230 is increased without increasing a physical size.

In an embodiment, in this embodiment of this application, for brevity of description, as shown in (a) in FIG. 8, an example in which a length C1 of the third radiator 230 is 62 mm and a width C2 is 10 mm is used for description. As shown in (b) in FIG. 8, an example in which a thickness C3 of the third radiator 230 is 1.2 mm is used for description, and may be adjusted based on an actual operating frequency band.

Figure 9:
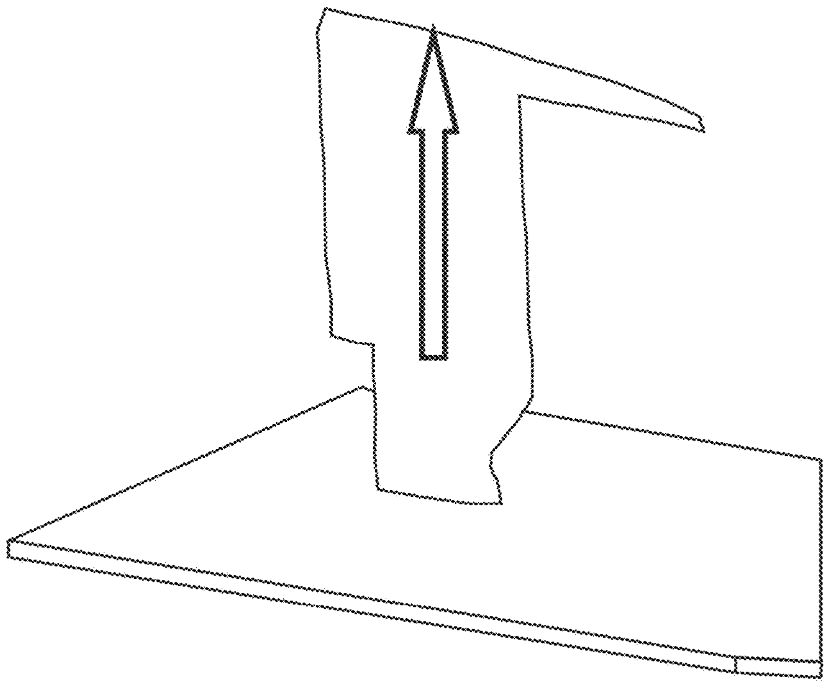
FIG. 9 is a schematic diagram of corresponding current distribution when the first antenna unit operates in a first frequency band.
Figure 10:
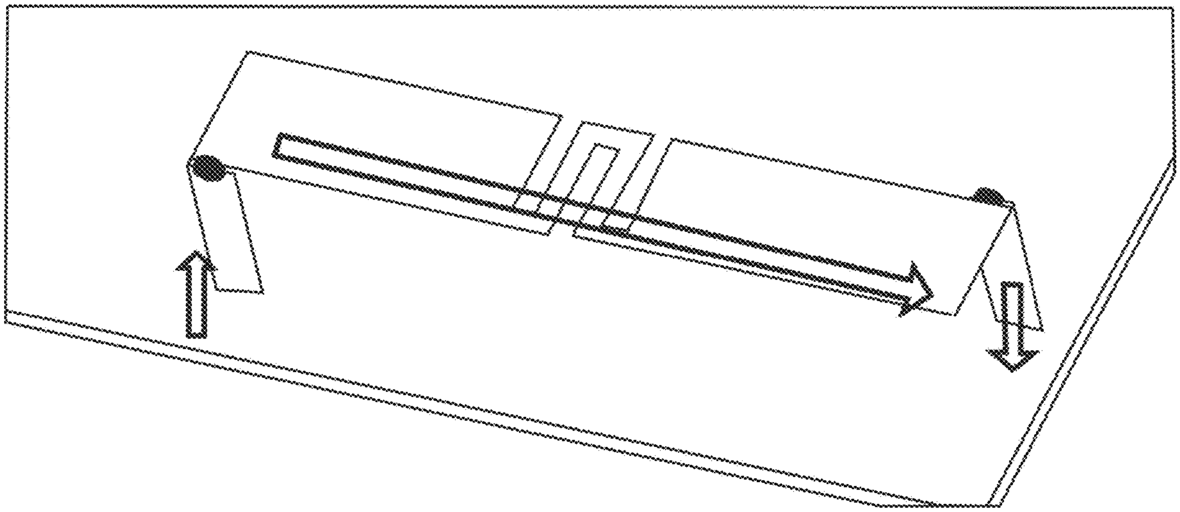
FIG. 10 is a schematic diagram of corresponding current distribution when the second antenna unit operates in a first frequency band.
Figure 11:
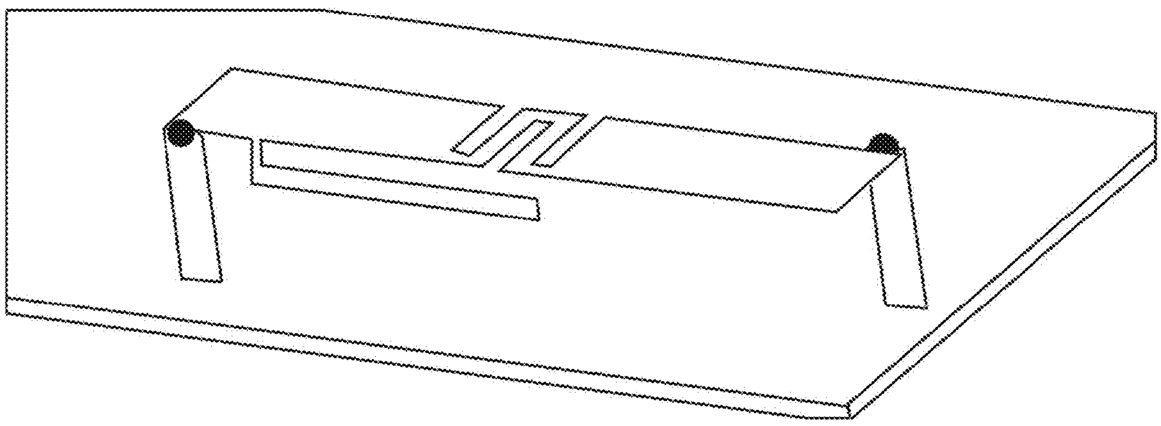
FIG. 11 is a schematic diagram of corresponding current distribution when a parasitic branch of the second antenna unit operates.

FIG. 9 to FIG. 11 each are a schematic diagram of current distribution of a radiator at 900 MHz according to an embodiment of this application. FIG. 9 is a schematic diagram of corresponding current distribution when the first antenna unit operates in the first frequency band. FIG. 10 is a schematic diagram of corresponding current distribution when the second antenna unit operates in the first frequency band. FIG. 11 is a schematic diagram of corresponding current distribution when a parasitic branch of the second antenna unit operates.

As shown in FIG. 9, when the first feed unit operates, a current on the first radiator flows from one end close to the PCB to one end away from the PCB. For example, a current direction is perpendicular to the PCB.

As shown in FIG. 10, when the second feed unit operates, a current on the second radiator flows from one side of the second feed unit to a ground side. For example, a current direction is parallel to the PCB. Therefore, the current on the first radiator is orthogonal to the current on the second radiator, to ensure that the first antenna unit and the second antenna unit are still highly isolated at a small spacing. In addition, at 900 MHz, the third antenna unit is a monopole antenna, and a current on the third radiator is parallel to the current on the first radiator (where a phase difference between the currents is approximately 180°, and a deviation within an angle is allowed, for example, ±10°), to couple energy of the first radiator and energy of the second radiator, so that energy that can be coupled between the first radiator and the second radiator is reduced. Therefore, the third antenna unit used as a decoupling structure may further improve the isolation between the first antenna unit and the second antenna unit.

It should be understood that, to ensure that the current on the first radiator is orthogonal to the current on the second radiator, a layout manner used in this embodiment of this application is that the first radiator is disposed to be perpendicular to the PCB, and the second radiator is disposed in parallel to the PCB. This layout manner is merely used as an example. During actual application, another layout manner may be used. For example, the first radiator is disposed in parallel to the PCB, and the second radiator is disposed to be perpendicular to the PCB. For another example, both the first radiator and the second radiator are perpendicular to the PCB, a length direction of the first radiator is perpendicular to the PCB, and a length direction of the second radiator is parallel to the PCB. This layout can ensure that the current on the first radiator is orthogonal to the current on the second radiator. In some embodiments, another layout design may be used to achieve a same technical effect, provided that it is ensured that the current on the first radiator is orthogonal to the current on the second radiator.

As shown in FIG. 11, when the second feed unit operates, the parasitic branch may be excited, and an operating bandwidth of the second feed unit may be extended. For example, the resonance generated by the parasitic branch may include 1710 MHz to 2690 MHz, and correspond to the intermediate frequency band in the communication frequency band.

Figure 12:
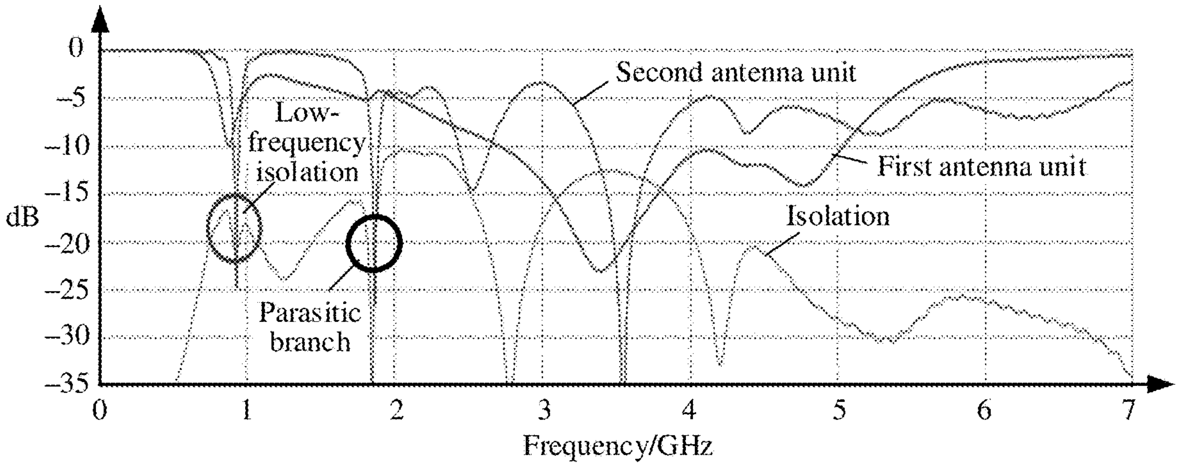
FIG. 12 is a simulation result diagram of S parameters of the first antenna unit and the second antenna unit.
Figure 13:
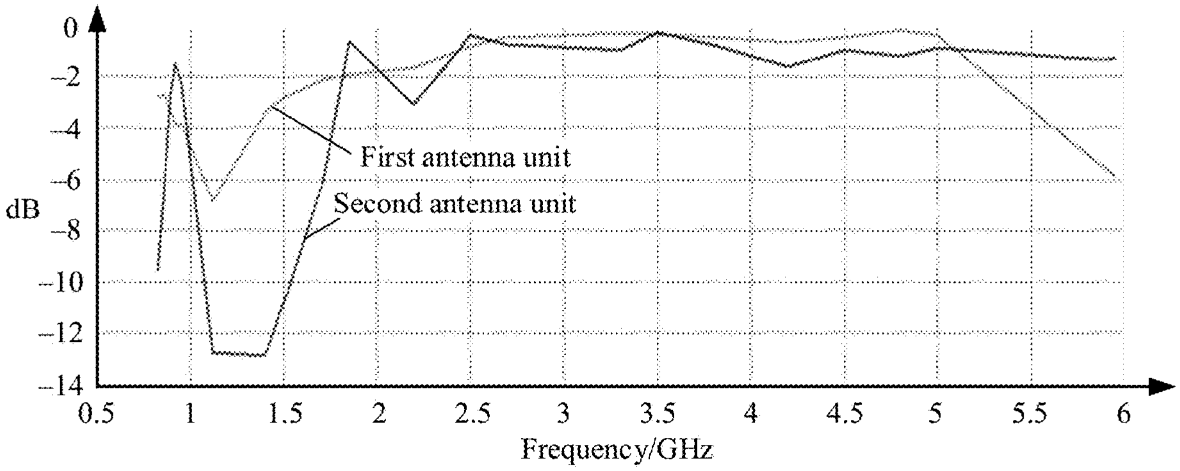
FIG. 13 is a simulation result diagram of system efficiency (total efficiency) of the first antenna unit and the second antenna unit.
Figure 14:
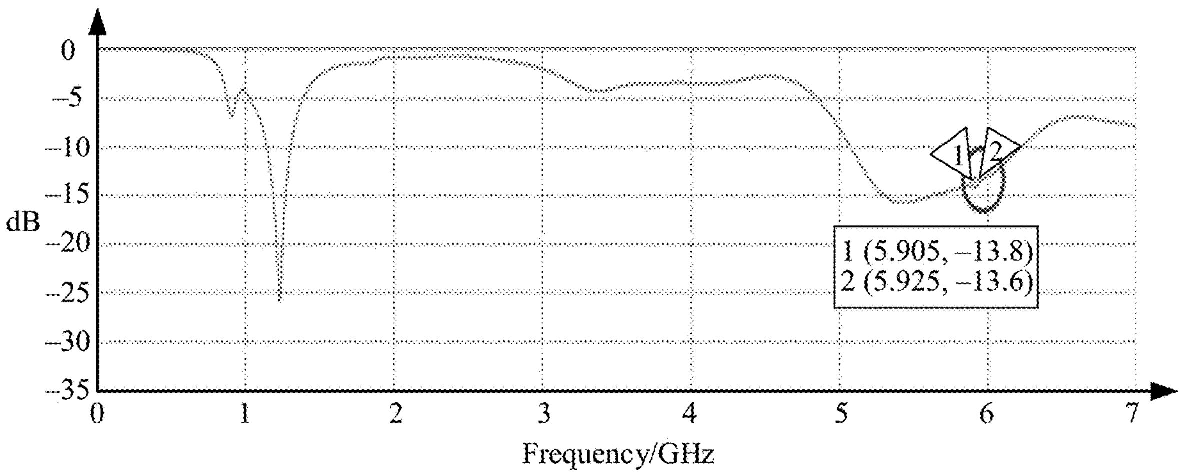
FIG. 14 is a simulation result diagram of an S parameter of the third antenna unit.
Figure 15:
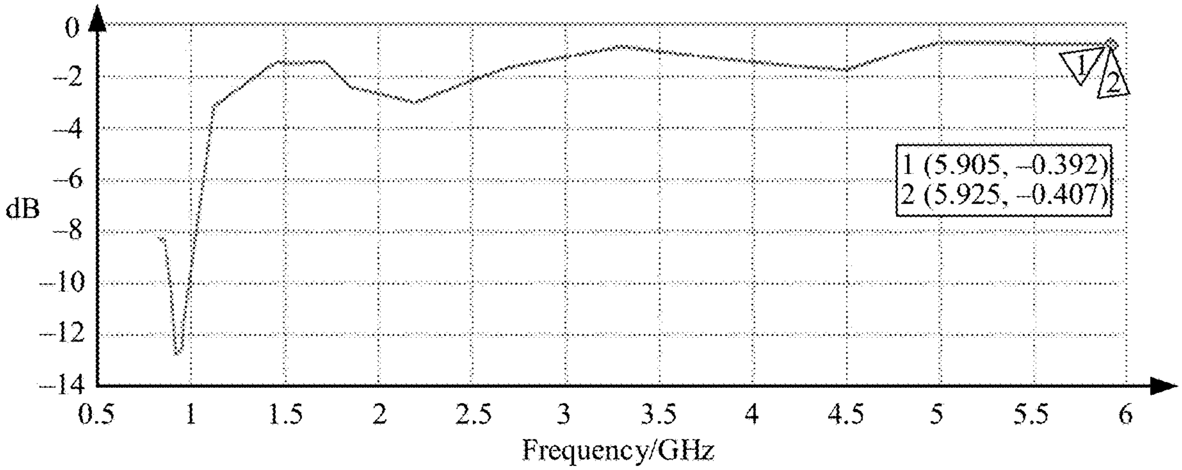
FIG. 15 is a simulation result diagram of radiation efficiency of the third antenna unit.

FIG. 12 to FIG. 15 each are a simulation result diagram according to an embodiment of this application. FIG. 12 is a simulation result diagram of S parameters of the first antenna unit and the second antenna unit. FIG. 13 is a simulation result diagram of system efficiency (total efficiency) of the first antenna unit and the second antenna unit. FIG. 14 is a simulation result diagram of an S parameter of the third antenna unit. FIG. 15 is a simulation result diagram of radiation efficiency of the third antenna unit.

As shown in FIG. 12, when the first feed unit and the second feed unit perform feeding, resonances generated by the first antenna unit and the second antenna unit may include a low frequency band (824 MHz to 960 MHz), an intermediate frequency band (1710 MHz to 2690 MHz), and a high frequency band (3300 MHz to 5000 MHz). In addition, because the currents on the radiator of the first antenna unit and the radiator of the second antenna unit are orthogonal, good isolation is achieved in each frequency band generated by the first antenna unit and the second antenna unit, and the isolation is less than −10 dB. In addition, because the parasitic branch is added to the second antenna unit, the bandwidth of the second antenna unit may be extended, and isolation of the second antenna unit may meet a communication requirement.

It should be understood that, in the resonances generated by the antenna unit, a wavelength corresponding to the low frequency band is longer. Therefore, in the conventional technology, a distance between antenna units in the low frequency band corresponds to a longer physical length. In this embodiment of this application, the distance between the first antenna unit and the second antenna unit is merely 12 mm, and using 900 MHz as an example, the distance is equivalent to merely 0.035 times of an operating wavelength. In addition to a compact layout of the antenna units, it can be ensured that the isolation between the first antenna unit and the second antenna unit is greater than −15 dB in an entire low frequency band, and a high point of the isolation between the first antenna unit and the second antenna unit is greater than −20 dB.

As shown in FIG. 13, in operating frequency bands corresponding to resonances generated by the first feed unit and the second feed unit, system efficiency may also meet a communication requirement. For example, the system efficiency is greater than −6 dB in the operating frequency band.

As shown in FIG. 14, when the third feed unit performs feeding, the third antenna unit may generate a plurality of resonances, which may include a low frequency band (824 MHz to 960 MHz), or may include a high frequency band (5905 MHz to 5925 MHz). In the low frequency band, the third antenna unit may be used as the decoupling structure between the first antenna unit and the second antenna unit, to improve the isolation between the first antenna unit and the second antenna unit. In the high frequency band, the third antenna unit may be used as the V2X antenna.

As shown in FIG. 15, in the high frequency band, in an operating frequency band corresponding to the resonance generated by the third antenna unit, radiation efficiency may meet a communication requirement. For example, system efficiency in the operating frequency band is greater than −6 dB.

Figure 16:
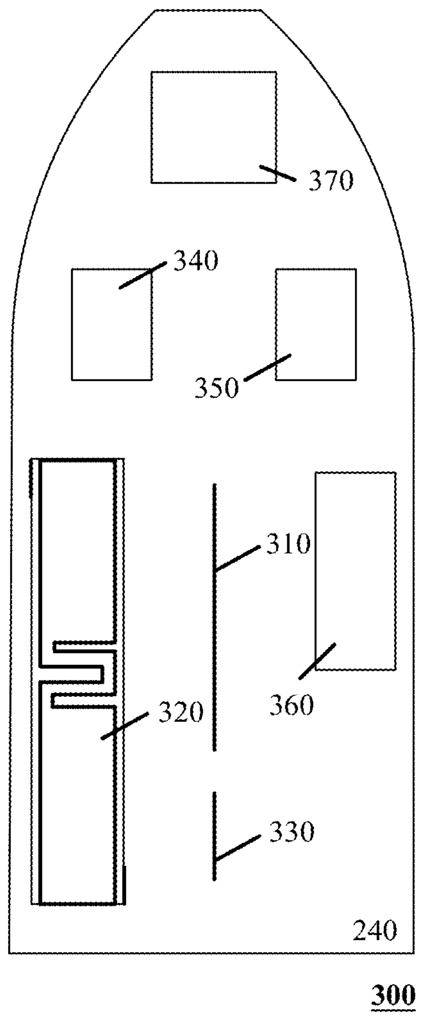
FIG. 16 is a schematic diagram of an antenna layout according to an embodiment of this application.

FIG. 16 is a schematic diagram of an antenna layout according to an embodiment of this application.

As shown in FIG. 16, an antenna 300 may include a first antenna unit 310, a second antenna unit 320, and a third antenna unit 330 described in the foregoing embodiments, and may further include another antenna unit to meet a communication requirement.

In an embodiment, the antenna 300 may include a fourth antenna unit 340, a fifth antenna unit 350, a sixth antenna unit 360, and a seventh antenna unit 370. The fourth antenna unit 340 and the fifth antenna unit 350 may operate in a 5G frequency band (3300 MHz to 5000 MHz), and are used together with the first antenna unit 310 and the second antenna unit 320 as subunits in a MIMO system. The fifth antenna unit 350 may operate in a V2X frequency band (5905 MHz to 5925 MHz), and form an array with the third antenna unit 330. The sixth antenna unit 360 may operate in a GNSS frequency band, and provide a positioning function.

It should be understood that a layout of the first antenna unit 310, the second antenna unit 320, the third antenna unit 330, the fourth antenna unit 340, the fifth antenna unit 350, the sixth antenna unit 360, and the seventh antenna unit 370 in this embodiment of this application in space is merely used as an example, and may be adjusted based on actual production or designs. Alternatively, a quantity of antenna units may be adjusted based on an actual communication requirement, and the quantity of antenna units is increased or reduced in a layout solution shown in FIG. 16. This is not limited in this application.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna, comprising:
- a printed circuit board (PCB);
- a first radiator disposed on the PCB;
- a second radiator disposed on the PCB;
- a third radiator disposed on the PCB;
- a feed unit;
- a feed piece electrically connected to the feed unit and disposed at a first end of the second radiator, wherein a first slot is formed between the feed piece and the second radiator; and
- a grounding piece electrically connected to the PCB and disposed at a second end of the second radiator, wherein
  - a second slot is formed between the grounding piece and the second radiator;
  - operating frequency bands of the first radiator and the second radiator comprise a first frequency band;

a resonance frequency band generated by the third radiator comprises the first frequency band;

a current on the first radiator is orthogonal to a current on the second radiator; and a distance between the first radiator, the second radiator, and the third radiator is less than a half of a first wavelength, and the first wavelength is a wavelength corresponding to the first frequency band.

2. The antenna according to claim 1, wherein the first radiator is perpendicular to the PCB; and the second radiator is parallel to the PCB.

3. The antenna according to claim 1, wherein a part of the third radiator is parallel to a part of the first radiator or a part of the second radiator.

4. The antenna according to claim 1, wherein the distance between the first radiator and the second radiator is less than one eighth of the first wavelength.

5. The antenna according to claim 1, wherein the first radiator and the second radiator are respectively located on two sides of the third radiator.

6. The antenna according to claim 1, further comprising:

a first capacitor disposed in the first slot, wherein one end of the first capacitor is electrically connected to the second radiator, and the other end of the first capacitor is electrically connected to the feed piece; and a second capacitor disposed in the second slot, wherein one end of the second capacitor is electrically connected to the second radiator, and the other end of the second capacitor is electrically connected to the grounding piece.

7. The antenna according to claim 1, further comprising:

a dielectric layer, wherein the second radiator is disposed on an upper surface of the dielectric layer; and the feed piece and the grounding piece are disposed on different side surfaces of the dielectric layer.

8. The antenna according to claim 7, further comprising:

a parasitic branch disposed on the same side surface of the dielectric layer with the feed piece.

9. The antenna according to claim 1, further comprising:

a first bending region, wherein the second radiator in the first bending region is bent.

10. The antenna according to claim 9, further comprising:

a second bending region, wherein the third radiator in the second bending region is bent.

11. The antenna according to claim 10, wherein the resonance frequency band of the third radiator comprises 5905 MHz to 5925 MHz.

12. The antenna according to claim 1, wherein the first frequency band is 824 MHz to 960 MHz.

13. A vehicle, wherein the vehicle comprises an antenna that comprises:

a printed circuit board (PCB);

a first radiator disposed on the PCB;

a second radiator disposed on the PCB; and a third radiator disposed on the PCB;

a feed unit;

a feed piece electrically connected to the feed unit and disposed at a first end of the second radiator, wherein a first slot is formed between the feed piece and the second radiator; and a grounding piece electrically connected to the PCB and disposed at a second end of the second radiator, wherein a second slot is formed between the grounding piece and the second radiator;

operating frequency bands of the first radiator and the second radiator comprise a first frequency band;

a resonance frequency band generated by the third radiator comprises the first frequency band;

a current on the first radiator is orthogonal to a current on the second radiator; and a distance between the first radiator, the second radiator, and the third radiator is less than a half of a first wavelength, and the first wavelength is a wavelength corresponding to the first frequency band.

14. The vehicle according to claim 13, wherein the first radiator is perpendicular to the PCB; and the second radiator is parallel to the PCB.

15. The vehicle according to claim 13, wherein a part of the third radiator is parallel to a part of the first radiator or a part of the second radiator.

16. The vehicle according to claim 13, wherein the distance between the first radiator and the second radiator is less than one eighth of the first wavelength.

17. The vehicle according to claim 13, wherein the first radiator and the second radiator are respectively located on two sides of the third radiator.

18. The vehicle according to claim 13, wherein the antenna is disposed in a shark-fin shaped part on a vehicle roof.

19. The vehicle according to claim 13, wherein the antenna further comprises:

a dielectric layer, wherein the second radiator is disposed on an upper surface of the dielectric layer; and the feed piece and the grounding piece are disposed on different side surfaces of the dielectric layer.

20. The vehicle according to claim 19, wherein the antenna further comprises:

a parasitic branch disposed on the same side surface of the dielectric layer with the feed piece.

* * * * *